Feb. 1, 1949.  H. E. PAGE  2,460,359
SLIDE PROJECTOR AND MAGAZINE THEREFOR
Filed Sept. 18, 1945  3 Sheets-Sheet 1
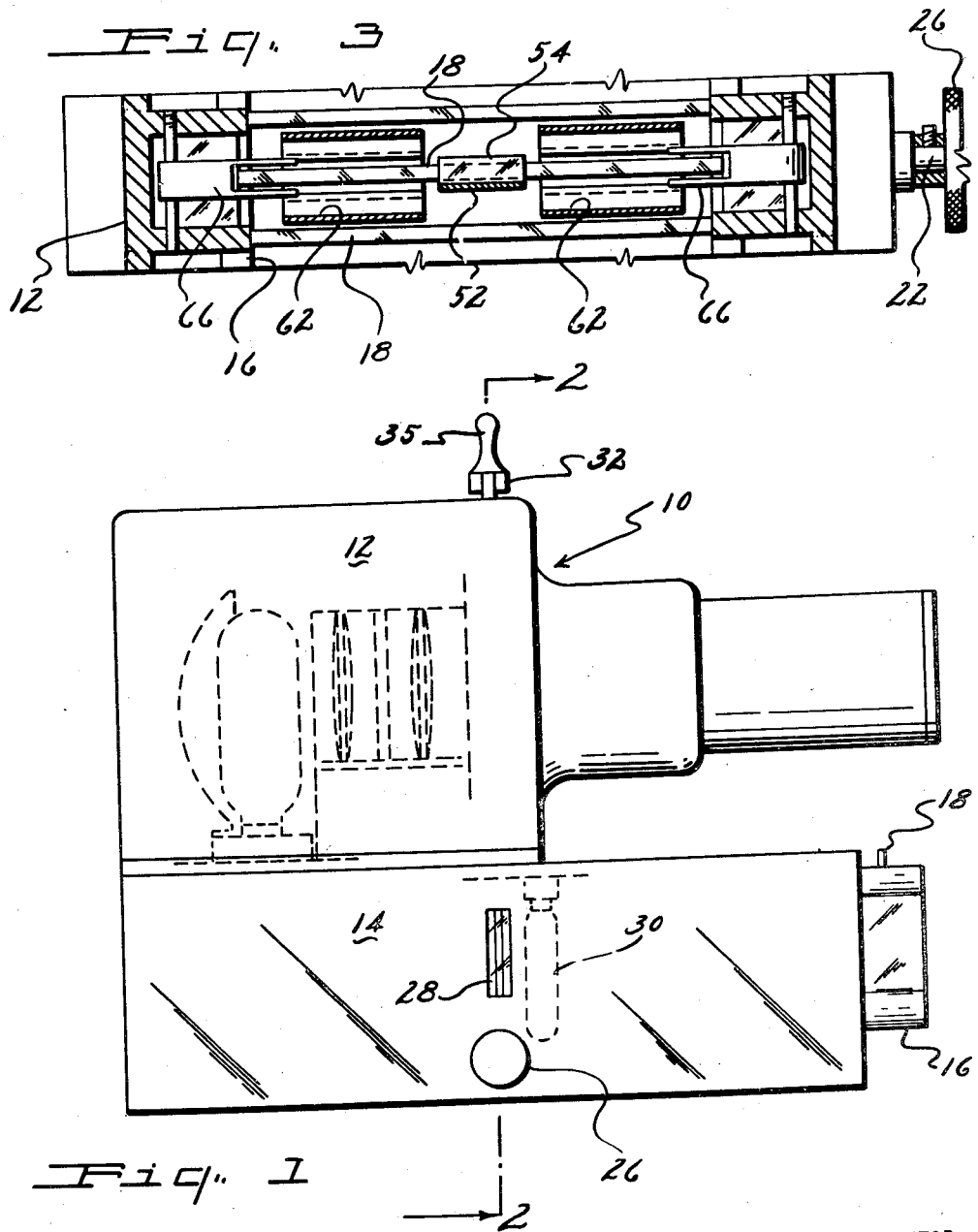
INVENTOR.
Herbert E. Page
BY
Attys.

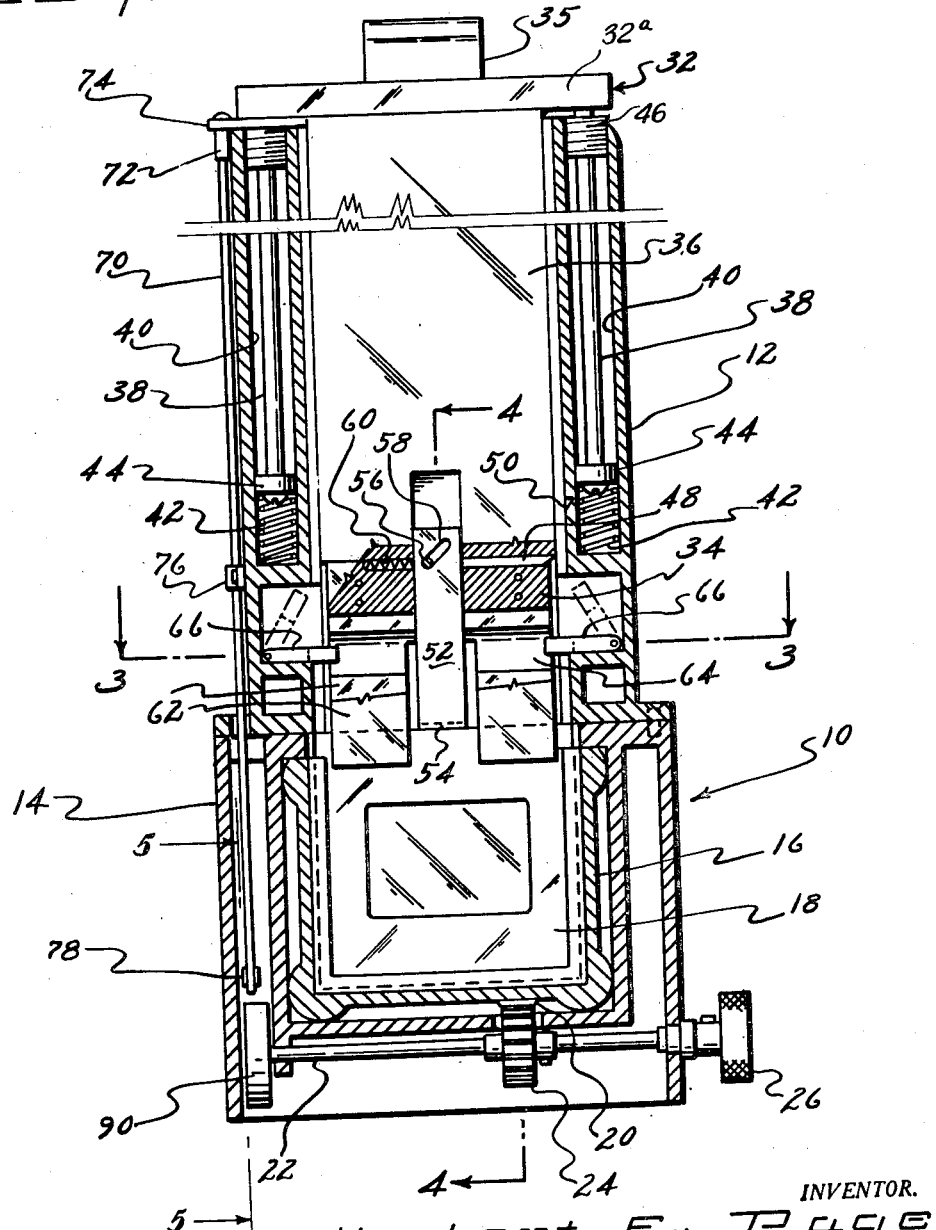

Feb. 1, 1949.    H. E. PAGE    2,460,359
SLIDE PROJECTOR AND MAGAZINE THEREFOR
Filed Sept. 18, 1945    3 Sheets-Sheet 3
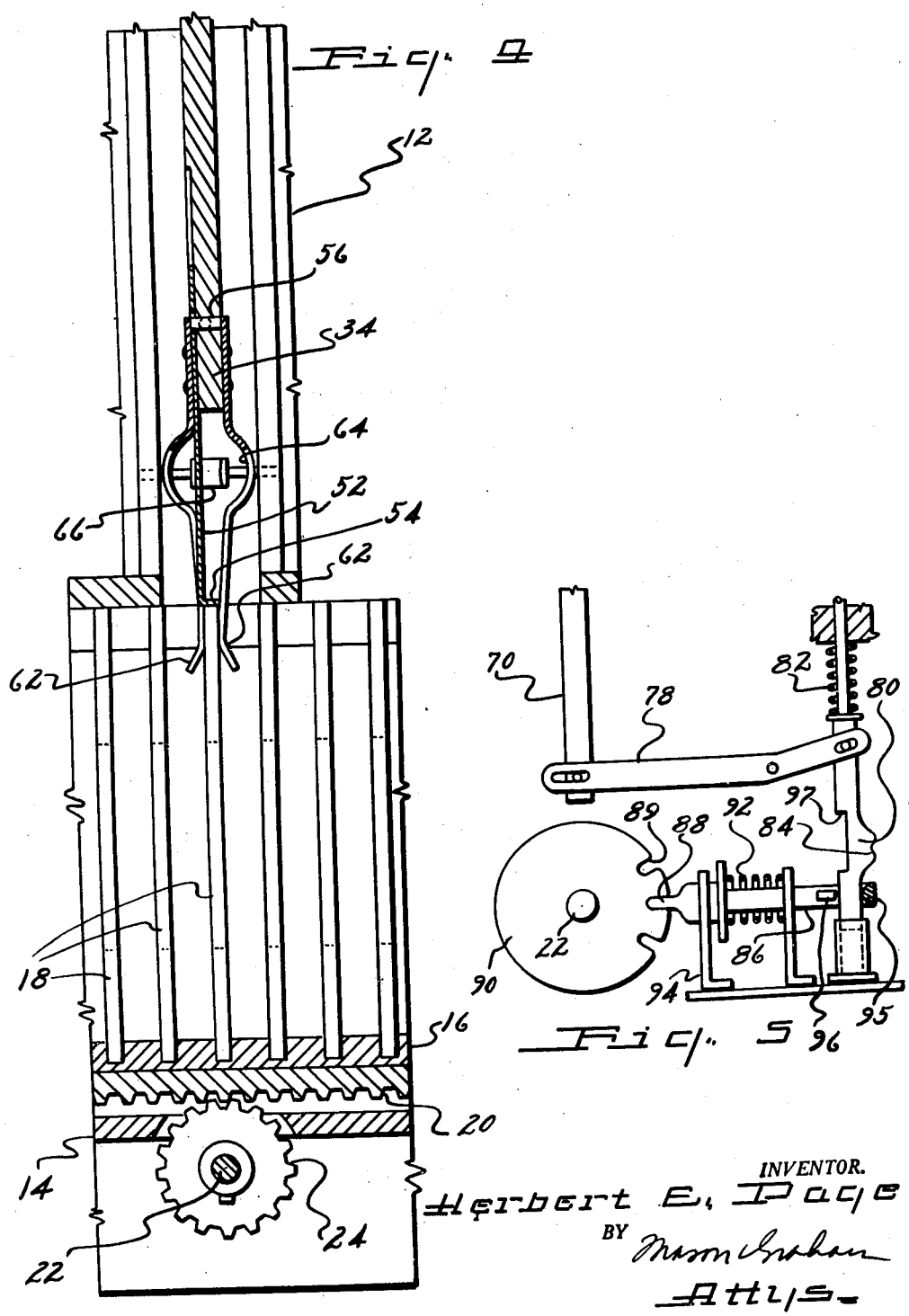
INVENTOR.
Herbert E. Page
BY
Attys.

Patented Feb. 1, 1949

2,460,359

UNITED STATES PATENT OFFICE 2,460,359

SLIDE PROJECTOR AND MAGAZINE THEREFOR

Herbert E. Page, Alhambra, Calif.

Application September 18, 1945, Serial No. 617,095

5 Claims. (Cl. 88—28)

My invention relates to projectors of the kind adapted to throw images of transparent slides placed therein onto a screen.

Hitherto it has been difficult to throw images of any selected slides, from among a collection of slides, upon the screen without involving considerable waste of effort in locating the slides to be projected, inserting them in and removing them from the projector. In addition to the waste of time in inserting and removing slides considerable discomfort is caused the audience by the glare of the light upon the projection screen when no slide is in the projector.

Further, while various devices are in use for storing slides, it has been necessary to manually extract the slides to be shown from the file drawers or boxes, remove them to the projector, and later return them to the filing device, with the result that it is difficult to keep the slides properly filed.

It is a general object of my invention to provide a projector by the use of which the disadvantages above referred to may be avoided.

An object of the invention, therefore, is to provide a projector into which drawers containing slides can be inserted, mechanical means being provided to bring a selected slide into position to be projected upon the screen and thereafter returned by said means to the position in the drawer from which it was taken.

A further object of the invention is to provide means for locking the drawer in position during the time that the slide is out of the drawer to insure that the slide will be returned to its proper position in the drawer.

A still further object of the invention is to provide a projector of the kind described of simple yet efficient construction.

A further object of the invention is to provide a drawer in which the slides may be permanently filed and to arrange markings on the exterior of the drawer which are visible during the operation of the projector and means by which any desired slide, as indicated by the marking on the drawer, may be brought to the projection point.

A further object of the invention is to provide a projector having means to prevent the rays of the projection lamp from being thrown on the screen except when a slide is in position to be shown therein.

Further objects and features of the invention will appear in the following description taken in conjunction with the accompanying drawings.

In the drawings:

Fig. 1 is a side elevation of the projector of my invention;

Fig. 2 is a cross section on line 2—2 of Fig. 1;

Fig. 3 is a cross section on line 3—3 of Fig. 2;

Fig. 4 is a cross section on line 4—4 of Fig. 2, drawn to a larger scale; and

Fig. 5 is a view on line 5—5 of Fig. 2, drawn to a larger scale, showing locking mechanism for the drawer containing the slides to insure the proper functioning of the device.

In Fig. 1, the numeral 10 indicates the housing of the projector, which may conveniently be formed as a lamp housing 12 of rectangular form containing the usual lamp, reflector and lens system. The housing 12 is mounted on a base 14 formed to receive a drawer 16 in which a plurality of slides 18 may be permanently filed in a known order and equally spaced from one another. The form of the opening in the base and the contour of the outer surface of the drawers is such as to accurately position the drawer in the base. I prefer to number the position of the transparent slides in the drawer along the side of the drawer and to list the subjects of the slides against these numbers in any convenient manner, as for instance, on a card which may be kept with the projector.

By means later described, any desired number may be brought to the projection point, the corresponding slide raised to the proper position, thrown on the screen, and returned to its proper place in the drawer. The drawer 16 may of course be withdrawn and replaced by other filing drawers identically constructed.

The mechanism used to move the drawer 16 through the base 14 of the projector may be arranged in various ways, as for instance, by the provision of a carriage which may be displaced by suitable means, but as shown in the illustrated embodiment of the invention, the drawers are all furnished with racks 20 running lengthwise on the bottom thereof. A spindle 22 is arranged to extend across the base 14 below the drawer and carries a gear 24 meshing with the rack, which may be rotated by a thumb wheel 26. The base is provided with a window 28 in line with the mechanism transferring the slides to the projection point, and a small electric bulb 30 is arranged in such a position that light is thrown through the window to illuminate the numbers appearing on the side of the drawer in line with each slide. By these means any desired slide in the drawer may be brought to the projection point.

The mechanism for raising the slides from the drawer into position to be projected comprises a transfer slide 32 formed from metal or plastic and provided with upper and lower panel 36 transverse members 32a and 34 respectively, the upper member being provided with a finger grip 35. The transfer slide is mounted for movement in a vertical plane by means of rods 38 extending into vertically arranged bores 40 formed in the wall of the lamp housing. Springs 42 are arranged in the bores and act against heads 44 secured to the lower ends of the rods and guided by the walls of the bores. The rods pass through threaded ferrules 46 screwed into the upper end of the bores, the ferrules acting to guide the rods and to prevent them from being completely withdrawn from the bores. The lower transverse member 34 is provided with a detent 48 slidably mounted in a bore in the lower transverse member and arranged to engage in a notch 50 formed in a side wall of the lamp housing but movable out of engagement with said notch when a slide is to be raised into position to be projected. Withdrawal of detent 48 is effected by a tongue 52 arranged for vertical sliding movement on the transfer slide and having an inturned lower edge 54 adapted to engage against the top of a transparent slide 18 when the transfer slide is moved to its lowermost position. The tongue 52 is resiliently held in lowered position by means of a pin 56 projecting from the detent 48 and engaging with sloped slot 58 formed in the tongue. The detent 48 is resiliently urged by a spring 60 arranged between the end of the bore and the inner end of the detent 48 so that the pin 56 tends to ride up the lower edge of the sloped slot, thereby forcing the tongue downwardly.

Pairs of spring fingers 62 are arranged at each side of the tongue 52 to grip the slides 18, each comprising sheet metal strips having an outwardly bowed portion 64 adjacent the lower edge of the member 34. The lower ends of the fingers are bent away from each other to facilitate movement over the top of the slide to be raised.

When the transfer slide 32 is lowered, it is evident that the spring fingers will engage over the upper edge of a transparent slide in the drawer and are of sufficient strength to support the slide when the transfer slide is moved in upward direction.

The length of travel permitted the transfer slide is such as to hold the transparent slides in the proper position for projection.

To return the slide into the drawer, it is necessary to cause the spring fingers to separate from the slide and to obtain this result I provide pivoted fingers 66 at each side of the housing of such length that they will be engaged in the outwardly bowed portion of the fingers on the downward movement thereof. The free ends of the pivoted member 66 are slotted, as shown in Fig. 4, to enable the transparent slides to pass through the ends of the members together with the tongue 52 which will be resting on the upper edge of the slides.

In the downward movement of the transfer slide the lower ends of the spring fingers will engage with the outer periphery of the members 66 and will be spread apart to such an extent that the transparent slide will be released and will fall back into the compartment from which it was raised. During upward movement of the fingers the ends of the pivoted member 66 will merely be raised about their pivoted ends and will not affect the grip of the fingers on the slide.

I prefer to provide means for locking the magazine drawer against movement during the time that a slide is raised out of the drawer to insure that the slide is returned to its proper place. While any suitable means may be arranged for this purpose, the construction shown in detail in Fig. 5 comprises a rod 70 secured by a ferrule 72 to a short cross bar 74 lying under the upper transverse member 32. The rod may be guided for movement by brackets 76 screwed to the side of the housing 12. The lower end of the rod 70 engages the longer arm of a pivoted lever 78 by a pin and slot connection. The shorter arm of the lever has a pin and slot connection with a cam member 80 guided for vertical movement and normally urged in downward direction by a spring 82. The cam member carries a cam face 84 which is effective, at the position in which the transfer slide is arrested by engagement of detent 48 with notch 50, to withdraw a detent member 86 freeing the drawer for movement.

The detent member 86 comprises a rod ending in a tooth 88 adapted to engage in one of a series of notches 89 formed in the periphery of a locking wheel 90 mounted on the spindle 22. The rod 86 is urged to engage the tooth 88 with the notched periphery of the locking wheel by means of a spring 92 and is guided for reciprocatory movement by brackets 94.

The cam 84 engages against a cam face 95 formed on the end of the member 86 and acts to withdraw the tooth 88 from the periphery of the wheel 90 when resting against the cam face.

In the withdrawn position, tooth 88 is positioned so that the curved portion of the periphery of the wheel between adjacent notches 89 will displace the member 86 rearwardly, but when the detent 86 is released by the engagement of the cam and cam face, spring 92 will engage the tooth 88 in a recess and prevent movement of the locking wheel and therefore will prevent movement of the drawer.

This distance between adjacent notches in the locking wheel is equal to the distance between adjacent slides in the drawer. In order to insure that the drawer is also accurately positioned and locked at the time the spring fingers 62 are moved downwardly to grip a transparent slide, I provide a projection 96 on detent 86 and a cut out 97 in the cam member. When the tooth 88 is fully engaged in a recess 89 the projection 94 is clear of the cut out 96. However, if the tooth is not fully engaged in a notch the projection 96 will be struck by the lower edge of the cut out and the spring fingers cannot be moved to engaging position until the transparent slide has been properly positioned by manipulation of the thumb wheel 26. It will be obvious that unfiled slides may be projected by withdrawing slides from a drawer and inserting the individual slides or by inserting them in an unfilled or partly filled drawer and then following the procedure previously described.

From the foregoing description it will be evident that I have provided a projector adapted to be used to project any desired slides filed in a definite numerical order in file drawers from which the slides may be raised, projected, and returned to the file drawer, and have provided means to properly align the slides with the mechanism transferring them to projection position and returning them to their proper position in the drawer.

I have also provided means for cutting off the light from the projection lamp except when a slide is in position to be projected since, when a slide is not in position, the transfer slide member 36 will be arrested by the engagement of the detent 48 with the notch 50 in position to interrupt the beam of the lamp.

While I have described and illustrated a preferred form of my invention, it is to be understood that the scope of the invention is not in any way limited by this illustrative showing but only as indicated by the scope of the appended claims.

I claim:

1. In a projector for transparent slides filed in a container, said projector having a housing structure with a passage for the slide container formed in the lower portion thereof and a projection system in an upper portion thereof, transfer means to raise a slide from said container into place to be projected by the projection system and to return it to the position in said container from which it was taken comprising: an opaque panel mounted for vertical movement in the upper part of the housing across the path of the beam of light projected by said projection system; a detent mounted at the lower end of said panel adapted to engage in a recess formed in the wall of said housing and normally preventing the panel from moving upwardly sufficiently to clear said beam; spring fingers depending from said panel and adapted to engage with the slide to be projected when said panel is moved downwardly; and means actuated by the upper edge of a slide when held by said spring fingers to withdraw said detent from the recess and enable the panel to be raised sufficiently to clear said beam and to hold the slide in position to be projected.

2. In a projector for transparent slides filed in a container, said projector having a housing structure with a passage for the slide container formed in the lower portion thereof and a projection system in an upper portion thereof, transfer means to raise a slide from said container into place to be projected by the projection system and to return it to the position in said container from which it was taken comprising: an opaque panel mounted for vertical movement in the upper part of the housing across the path of the beam of light projected by said projection system; a detent mounted at the lower end of said panel adapted to engage in a recess formed in the wall of said housing and normally preventing the panel from moving upwardly sufficiently to clear said beam; spring fingers depending from said panel and adapted to engage with the slide to be projected when said panel is moved downwardly; means actuated by the upper edge of a slide when held by said spring fingers to withdraw said detent from the recess and enable the panel to be raised sufficiently to clear said beam and to hold the slide in position to be projected; and means acting to lock the slide container in adjusted position while said transfer means are operated to remove a slide from said container and until said slide has been again returned to the place in said container from which it was taken and said transfer means are in rest position.

3. In a projector for transparent slides filed in a container, said projector having a housing structure with a passage for the slide container formed in the lower portion thereof and a projection system in an upper portion thereof, transfer means to raise a slide from said container into place to be projected by the projection system and to return it to the position in said container from which it was taken comprising: an opaque panel mounted for vertical movement in the upper part of the housing across the path of the beam of light projected by said projection system; a detent mounted at the lower end of said panel adapted to engage in a recess formed in the wall of said housing and normally preventing the panel from moving upwardly sufficiently to clear said beam; spring fingers depending from said panel and adapted to engage a transparent slide when the panel is moved downwardly; a tongue mounted for sliding movement on said panel and projecting downwardly to engage with and be moved by the upper edge of a transparent slide when the panel is moved downwardly; and a pin projecting from said detent engaging in a slot formed in said tongue whereby the movement of said tongue acts to free said detent from the housing to permit said panel to raise the slide into position to be projected.

4. In a projector for transparent slides filed in a container, said projector having a housing structure with a passage for the slide container in the lower portion thereof and a projection system in an upper portion thereof, transfer means to raise a slide from said container into place to be projected by the projection system and to return it to the position in said container from which it was taken comprising: a panel mounted for vertical movement in the upper part of the housing across the path of the beam of light projected by said projection system; interengaging means on said panel and said housing normally preventing the panel from moving upwardly sufficiently to clear said beam; slide grasping means depending from said panel for grasping the slide to be projected when said panel is moved downwardly; and means actuated by a slide when held by said slide grasping means for releasing said interengaging means to permit the panel to be raised sufficiently to clear said beam.

5. In a projector for transparent slides filed in a container, said projector having a housing structure with a passage for the slide container in the lower portion thereof and a projection system in an upper portion thereof, transfer means to raise a slide from said container into place to be projected by the projection system and to return it to the position in said container from which it was taken comprising: a panel mounted for vertical movement in the upper part of the housing across the path of the beam of light projected by said projection system; interengaging means on said panel and said housing normally preventing the panel from moving upwardly sufficiently to clear said beam; slide grasping means comprising spring fingers depending from said panel and adapted to engage with the slide to be projected when said panel is moved downwardly; and means actuated by a slide when held by said slide grasping means for releasing said interengaging means to permit the panel to be raised sufficiently to clear said beam.

HERBERT E. PAGE.

REFERENCES CITED

The following references are of record in the file of this patent:

UNITED STATES PATENTS

| Number | Name | Date |
| --- | --- | --- |
| 594,819 | Allen | Nov. 30, 1897 |
| 773,786 | Colardeau et al. | Nov. 1, 1904 |
| 788,470 | Jehn | Apr. 25, 1905 |
| 1,371,871 | Dietz | Mar. 15, 1921 |
| 1,402,791 | Petherick | Jan. 10, 1922 |